United States Patent
Guy

(10) Patent No.: US 7,021,796 B2
(45) Date of Patent: Apr. 4, 2006

(54) LIGHT ENGINE APPARATUS AND METHOD

(75) Inventor: James Kevan Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 10/340,977

(22) Filed: Jan. 13, 2003

(65) Prior Publication Data

US 2004/0136081 A1 Jul. 15, 2004

(51) Int. Cl.
*F21V 7/08* (2006.01)

(52) U.S. Cl. .................. 362/308; 362/310; 362/328

(58) Field of Classification Search ............ 362/257, 362/309, 554, 299, 308, 310, 329, 350, 17, 362/3, 16, 551, 307, 296–298, 311, 317, 341, 362/326–328, 346, 347; 359/629, 483; 385/31
See application file for complete search history.

(56) References Cited

U.S. PATENT DOCUMENTS

| 2,803,756 | A | * | 8/1957 | Cox ........................ 250/224 |
| 4,811,174 | A | * | 3/1989 | Kanzler et al. ............ 362/299 |
| 5,235,470 | A | * | 8/1993 | Cheng ....................... 362/350 |
| 5,390,265 | A | * | 2/1995 | Jiao ............................ 385/15 |
| 5,924,792 | A | * | 7/1999 | Cassarly et al. ........... 362/554 |
| 5,967,647 | A | * | 10/1999 | Eichler ...................... 362/299 |
| 6,304,693 | B1 | * | 10/2001 | Buelow et al. .............. 385/31 |
| 6,351,058 | B1 | * | 2/2002 | Roberts .................... 362/310 |
| 6,406,171 | B1 | * | 6/2002 | Satsukawa et al. ........ 362/518 |
| 6,536,921 | B1 | * | 3/2003 | Simon ....................... 362/308 |
| 6,554,456 | B1 | * | 4/2003 | Buelow et al. ............ 362/350 |
| 6,635,012 | B1 | * | 10/2003 | Ayame et al. .............. 362/551 |

* cited by examiner

*Primary Examiner*—Thomas M. Sember
*Assistant Examiner*—Ismael Negron
(74) *Attorney, Agent, or Firm*—Harness Dickey & Pierce P.L.C.

(57) ABSTRACT

A light engine includes a light source disposed at a focus of four ellipsoidal reflectors, where the reflectors are arranged at 90 degrees relative to one another. A condensing lens is used with each reflector to focus forwardly directed, low angle light rays onto a target plane. Each reflector serves to reflect only the accurate, nigh angle light rays towards the target plane. Each reflector and its associated condenser produce a light beam having a reduced diameter (i.e., spot size) while also increasing the amount of optical energy directed at its respective target plane.

17 Claims, 7 Drawing Sheets

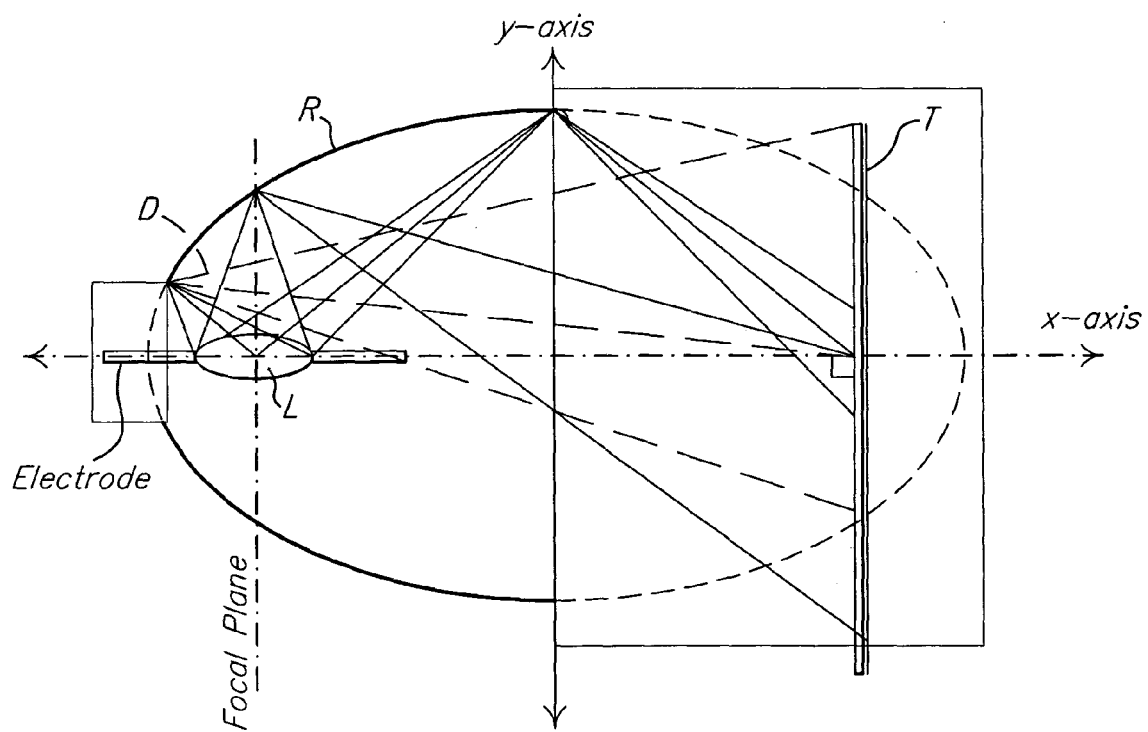
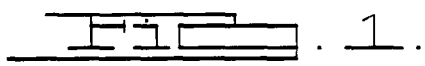
Prior Art
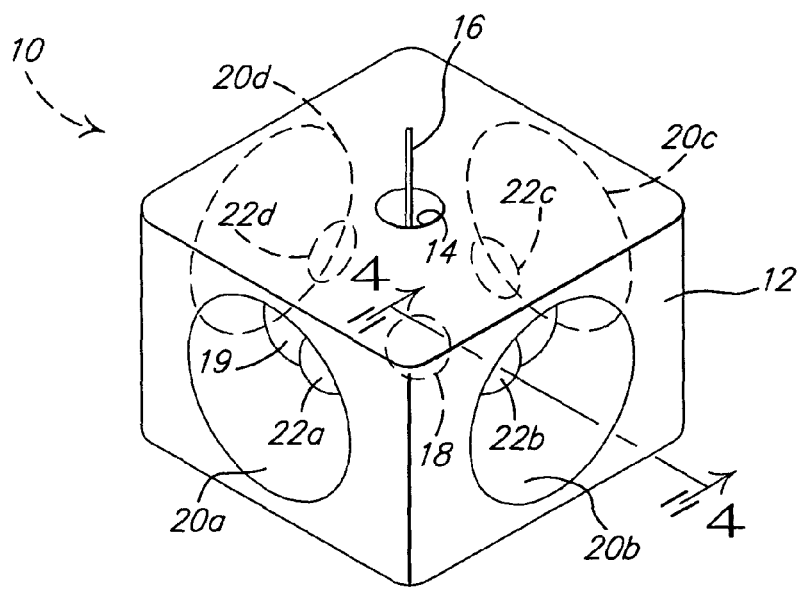
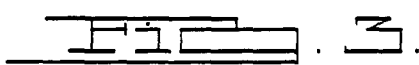

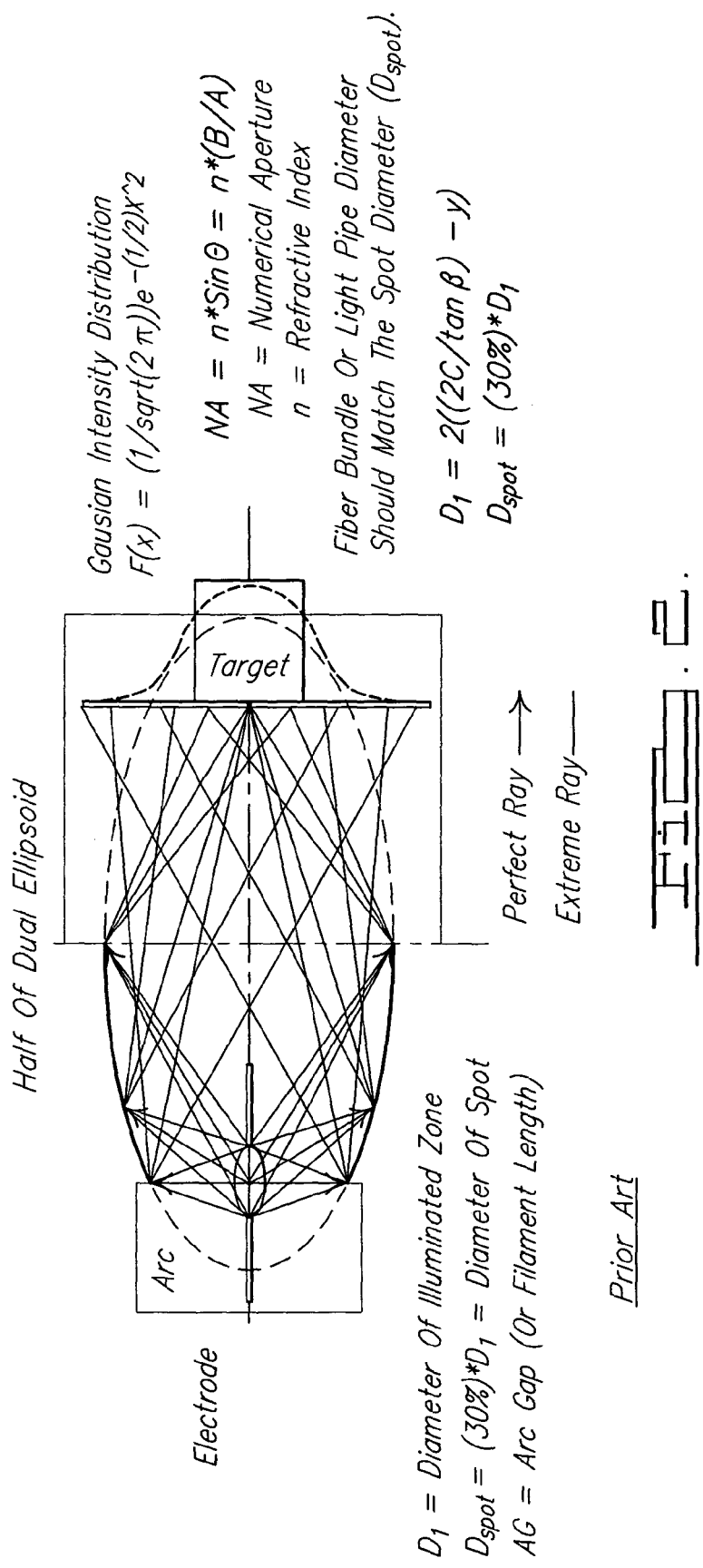

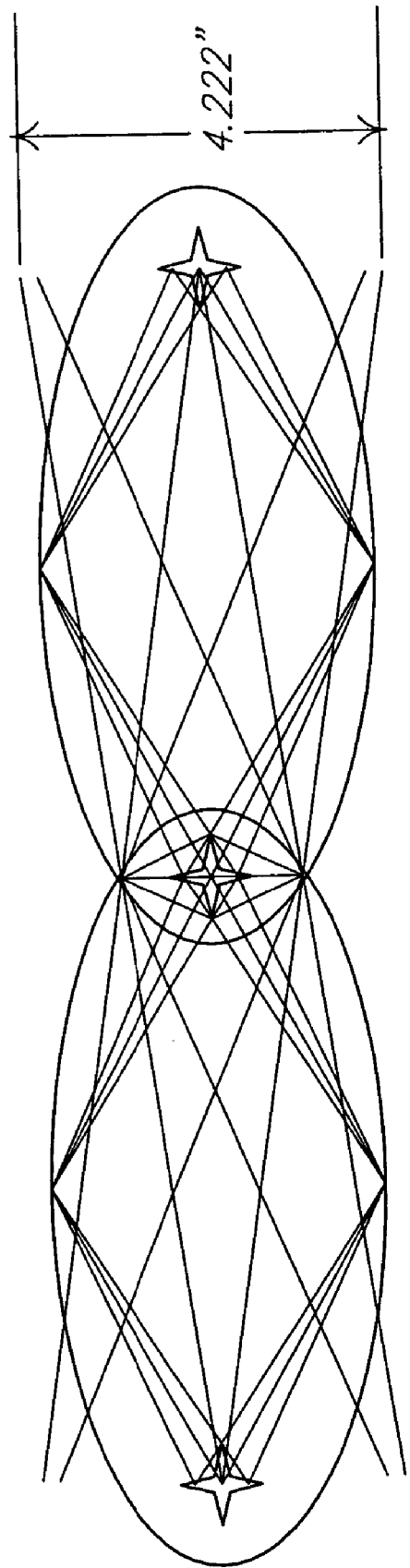
4.222" Illuminated Zone (Each Side)
2.111" Spot Size (Each Side)
6.73" Effective Diameter (Both Sides)
Prior Art

FIBER BUNDLE COUPLING % AS A FUNCTION OF SPOT SIZE, FIBER SIZE AND NUMBER OF FIBERS

| | | |
|---|---|---|
| 2500 | Bulb Wattage | |
| 2 | Number Of Ports | |
| 1.50 | Enter Fiber Diameter(mm) | |
| 85% | Enter Reflector Efficiency | |
| 9% | Calculated Interstitial Loss (Constant) | |
| 25% | Enter Misc. Coupling Losses (Clading, Filters, Hot Mirrors, Off Center Bundle, Etc.) | |
| 240,000 | Enter Bulb Raw Lumens | |
| 96 | Calculated Bulb Efficacy (Lumens/Watt) | |
| 1250.0 | Bulb Power Toward Port | |

| | | | | | | | Filter Transmission Percent | |
|---|---|---|---|---|---|---|---|---|
| | | | | | | | 30% | 7% |
| | | | | | | | Beam Splitter Green/Red | |
| Circle # | # Of Fibers (Hex Pattern) | Bundle Diameter (Inches) | % Area* (Bndl To Illum. Zone) | System Efficiency Into Fiber | Average Lumens/Fiber (White) | | Average Lumens/Fiber (Green @ 90 Deg.) | Average Lumens/Fiber (Red @ 0 Deg.) |
| 1 | 1 | 0.059 | 3% | 2% | 2244 | | 673 | 157.1 |
| 2 | 7 | 0.177 | 10% | 6% | 946 | | 284 | 66.2 |
| 3 | 19 | 0.295 | 16% | 9% | 571 | | 171 | 40.0 |
| 4 | 37 | 0.413 | 22% | 12% | 404 | | 121 | 28.3 |
| 5 | 61 | 0.531 | 27% | 16% | 309 | | 93 | 21.7 |
| 6 | 91 | 0.650 | 33% | 19% | 249 | | 75 | 17.4 |
| 7 | 127 | 0.768 | 38% | 22% | 207 | | 62 | 14.5 |
| 8 | 169 | 0.886 | 43% | 25% | 176 | | 53 | 12.3 |
| 9 | 217 | 1.004 | 48% | 28% | 153 | | 46 | 10.7 |
| 10 | 271 | 1.122 | 52% | 30% | 134 | | 40 | 9.4 |
| 11 | 331 | 1.240 | 57% | 33% | 119 | | 36 | 8.3 |
| 12 | 397 | 1.358 | 61% | 35% | 107 | | 32 | 7.5 |
| 13 | 469 | 1.476 | 65% | 38% | 96 | | 29 | 6.7 |
| 14 | 547 | 1.594 | 69% | 40% | 87 | | 26 | 6.1 |
| 15 | 631 | 1.713 | 72% | 42% | 79 | | 24 | 5.6 |
| 16 | 721 | 1.831 | 76% | 44% | 73 | | 22 | 5.1 |
| 17 | 817 | 1.949 | 79% | 45% | 67 | | 20 | 4.7 |

*% Area Is Estimated On A Triangular Distribution Pattern (Not Gaussian)

Mark IV Spot Size

Spot Size

FIG. 7.

FIBER BUNDLE COUPLING % AS A FUNCTION OF SPOT SIZE, FIBER SIZE AND NUMBER OF FIBERS

| Bulb Orientation | Arc Gap (mm) | Half Angle | NA of Fiber | Ellipse Constants | | | Illuminated Zone Dia. (Inches) | Spot Size At 1/2 Height-Dia. (Inches) | |
|---|---|---|---|---|---|---|---|---|---|
| | | | | Semi-Major A | Semi-Minor B | Center To Focus C | | | |
| Axial | 14 | 27 | 0.454 | 5.000 | 2.570 | 4.450 | 4.222 | 2.111 | Example |
| Cross Axis | 14 | 14 | | 2.856 | 2.257 | 1.750 | 2.296 | 1.148 | Example |
| Axial | 14 | 31 | 0.514 | 5.000 | 2.570 | 4.289 | 3.621 | 1.811 | |
| X-4 Axial | 14 | 27 | 0.454 | 5.000 | 2.570 | 4.450 | 0.550 | 0.276 | 0.953 sq-in |
| Variable | Enter the variables in the yellow boxes | | | | | | Eq. Diam. (4pcs) | | |

| | |
|---|---|
| 2500 | Bulb Wattage |
| 2 | Number Of Ports |
| 1.50 | Enter Fiber Diameter(mm) |
| 85% | Enter Reflector Efficiency |
| 9% | Calculated Interstitial Loss (Constant) |
| 25% | Enter Misc. Coupling Losses (Clading, Filters, Hot Mirrors, Off Center Bundle, Etc.) |
| 240,000 | Enter Bulb Raw Lumens |
| 96 | Calculated Bulb Efficacy (Lumens/Watt) |
| 625.0 | Bulb Power Toward Port |

| | | 5.97 | Equivalent Diameter-2 Ports |
| | | 1.10 | Equivalent Diameter-4 Ports |

| Circle # | # Of Fibers (Hex Pattern) | Bundle Diameter (Inches) | % Area* (Bndl To Illum. Zone) | System Efficiency Into Fiber | Average Lumens/Fiber (White) | Filter Transmission Percent | | Spot Size |
|---|---|---|---|---|---|---|---|---|
| | | | | | | 30% | 7% | |
| | | | | | | Beam Splitter Green/Red | | |
| | | | | | | Average Lumens/Fiber (Green @ 90 Deg.) | Average Lumens/Fiber (Red @ 0 Deg.) | |
| 1 | 1 | 0.059 | 20% | 12% | 7037 | 2111 | 492.6 | |
| 2 | 7 | 0.177 | 54% | 31% | 2674 | 802 | 187.2 | |
| 3 | 19 | 0.295 | 78% | 45% | 1432 | 430 | 100.3 | |
| 4 | 37 | 0.413 | 94% | 54% | 879 | 264 | 61.5 | |
| 5 | 61 | 0.531 | 100% | 58% | 568 | 170 | 39.8 | |

*% Area Is Estimated On A Triangular Distribution Pattern (Not Gaussian)

FIG. 11

LIGHT ENGINE APPARATUS AND METHOD

FIELD OF THE INVENTION

The present invention relates to optical systems, and more particularly to a light engine able to focus light from a light source into a light beam having a reduced spot size and increased optical energy.

BACKGROUND OF THE INVENTION

Light engines (often referred to as "illuminators") are used in many applications, and especially in fiber optic illumination applications. Light engines are typically used to locate a source of light remotely from an area to be illuminated. Several advantages are provided by being able to locate the light engine remotely from the area where the light it produces is to be used. Safety, spectrum control, thermal concerns, etc., are but a few reasons why it is often desirable to locate the light engine remotely from an area or object that is to be illuminated.

The problem with using light engines in fiber optic illumination systems is the needed efficiency. Direct illumination by a light source is the more efficient means for providing light. For fiber fed illuminators to compete with direct illumination systems, the efficiency and the amount of light transported by a fiber (or optical fiber bundle) needs to approach the system efficiency of a direct illumination system.

A specific limitation with present day fiber fed illuminators is the criticality of the diameter of the spot size of the beam of light produced by the illuminator. Ideally, the spot size should be minimized so as to better concentrate and focus the optical energy of the beam into the input face of an optical fiber or optical fiber bundle. There have been many attempts, with limited success, to control the spot size in an effort to reduce it so that the light beam from an illuminator can be focused into a smaller diameter optical fiber or a smaller diameter optical fiber bundle.

Many present day fiber fed illuminators incorporate some form of reflector system which is used to more closely focus the light from a light source of the illuminator. Such a system is shown in FIG. 1. The spot size of a beam produced by any given reflector system is governed by the physical size of the light source, the solid angle of the source radiation pattern and the numerical aperture (NA) of the wave guide, light pipe or fiber used to receive the reflected light. In FIG. 1, it will be noted that the light source "L" disposed at a focus (i.e., focal plane) of a reflector "R" produces a large beam ("spot") which covers substantially an entire face of a target "T". This is partly because "low angle" light rays, represented by dashed lines "D" are reflected by the reflector R, which produce a very large spot at the target. It would be much more desirable if only the more accurate "high angle" rays, such as rays "H", were reflected at the target T. However, forming the reflector such that the high angle rays are reflected results in a loss of a significant portion of the optical energy from the light source L. The use of various forms of reflectors alone, and in combination with a condensing lens, has failed to achieve a significant reduction in the spot size of the reflected beam. FIG. 2 illustrates a prior art dual ellipsoid reflector and the equations for predicting the distribution of the spot size of the beam reflected onto a target plane.

Many present day approaches which attempt to reduce the spot size of the light beam from a fiber fed illuminator make use of either a standard ellipsoidal reflector, a dual ellipsoidal reflector, a parabaloid reflector with some form of optical lens, and various other facetized versions of these approaches. All of these approaches are subject to a common geometric limitation. That limitation is that while a typical ellipsoidal reflector may very accurately direct the light source to an output location (i.e., focus) at source points close to the median of the ellipse, the reflected light diverges away from the output location as the source point moves away from the median of the ellipse. The spot size is governed by the numerical aperture (NA) of the accepting target, the solid angle of the source radiation pattern and the source's physical size.

In view of the above, it will be appreciated then that a standard ellipsoidal reflector has a geometric limitation for the spot size that it can produce. There have been many attempts to "piece wise" control the distribution of the output by facetizing the reflector. Facetized reflectors are designed to "tweak" the distribution of light at the target by orienting areas on the reflector surface (facets) in order to meet some predetermined output beam pattern. However, facetized reflectors still may not actually focus the source light better, but can sometimes distribute the light to better meet some predetermined requirement. More precise control of the output of the light source would allow even more light to be focused into a smaller diameter spot. In practical terms, this would allow for a smaller diameter optical fiber or optical fiber bundle to be used to receive the optical signal from the signal source to handle a given illumination task.

Accordingly, there still exists a need for a fiber fed light engine which is able to more closely focus a light beam from a light source in a manner that reduces the spot size of the beam to a greater degree than what is possible with present day light engines. Reducing the spot size of the beam would allow smaller diameter optical fibers and optical fiber bundles to be employed, which would significantly improve the overall efficiently of the system, in addition to reducing the overall cost and weight of a fiber optic illumination system.

SUMMARY OF THE INVENTION

The present invention is directed to a light engine which is capable of producing a beam having a reduced diameter spot size, and is thereby able to be used with smaller diameter optical fibers and optical fiber bundles or other light transmitting apparatuses. The light engine of the present invention, in one preferred form, includes a housing having a central hollowed out portion within which a light source is disposed. The light source generates an optical input signal. The hollowed out portion opens into a plurality of reflector portions that form apertures in the housing. The reflectors, in one preferred form, are arranged at 90° angles to one another. A refractive optical element is disposed adjacent to the light source in each reflector to receive a first portion of the optical input signal and to produce a first optical output component which is directed through an associated one of the apertures at a target. Each reflector is disposed adjacent the light source and coaxially aligned with an associated one of the refractive optical elements so as to reflect a second portion of the optical input signal and produce a second optical output component that is associated with one of the first optical output components and each focused at an associated target. The second portions represent only "high angle", accurate light ray components of the light generated by the light source. The first and second optical components cooperatively produce beams that have substantially similar spot sizes and which overlap one an other at the target. The resulting spot is not only smaller in diameter than what is produced by a conventional reflector system, but is also significantly increased in intensity.

In one preferred form the light engine comprises a housing having four ellipsoidal reflectors arranged at 90° angles relative to each other, with the light source disposed at a common focus of the reflectors. The optical element, in various preferred embodiments, comprises a refractive optical element, and more specifically a condensing lens, a light pipe or a gradient index (GRIN) lens. The refractive optical elements are disposed within the reflectors and effectively create a "shadow" zone within each reflector that extends from a central optical axis of each reflector up to an outer most edge of each reflector. The refractive optical elements effectively serve to capture the first portions of the optical input signal propagating within each reflector and to focus these portions into beams having a predetermined spot size that matches the spot size of the reflector. Second portions of the optical signal, which do not impinge the refractive optical elements, are focused (i.e., reflected) by the reflectors into beams each having a spot size substantially the same as that produced by the reflector's associated optical element, and further such that this beam overlaps the beam created by its associated optical element. The result is a significantly greater percentage of the optical input signal that is focused into a smaller diameter, higher intensity beam.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side view of a prior art reflector arrangement illustrating the relatively large spot size of the reflected beam produced by the reflector;

FIG. 2 is a view of one-half of a prior art dual ellipsoidal reflector system together with the equations for determining the spot size of the beam produced by the system;

FIG. 3 is a perspective view of a four port light engine in accordance with a preferred embodiment of the present invention;

FIG. 6 is a simplified side view of a well known, dual ellipsoidal geometry reflector system;

FIG. 7 is a chart representing the diameter of the spot size and energy transmitted by the reflector system of FIG. 6 for various size bundle diameters of optical fibers; and FIG. 8 is a chart illustrating the increase in power and the reduction in spot diameter provided by the light engine of the present invention, in comparison to that of the dual ellipsoidal geometry reflector system.

DETAILED DESCRIPTION OF THE PREFERRED EMBODIMENTS

Figure 4:
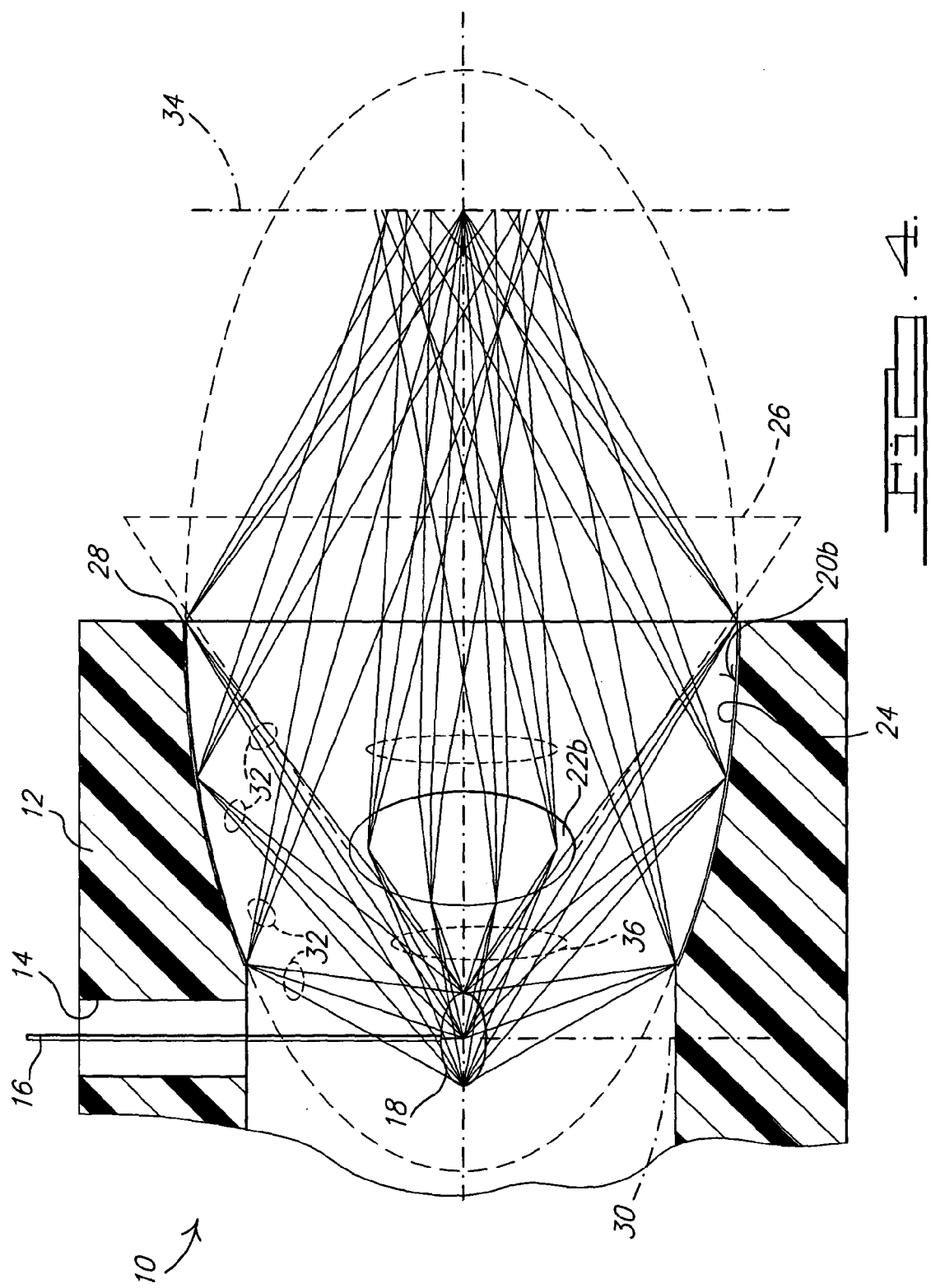
FIG. 4 is a simplified cross-sectional view taken in accordance with section line 4—4 in FIG. 3 illustrating in greater detail the arrangement of the light source and one condensing lens in relation to its associated reflector.

The following description of the preferred embodiment(s) is merely exemplary in nature and is in no way intended to limit the invention, its application, or uses.

Referring to FIG. 3, there is shown a light engine 10 in accordance with a preferred embodiment of the present invention. The light engine 10 includes a housing or structure 12 suitable for assisting in forming a plurality of reflector surfaces. The housing 12 includes a bore 14 through which a conductor 16 extends to a light source 18 disposed within a hollowed out central area 19 at a geometric center of the housing 12. A plurality of four frustoconical, ellipsoidal reflector portions 20a, 20b, 20c and 20d are formed in the housing 12 such that the light source 18 is disposed at a common focus of each of the reflector portions 20. Essentially, then, reflector portions 20a–20d form apertures in the housing 12 through which focused light beams can be projected.

With further reference to FIGS. 1 and 2, the light engine 10 further includes a plurality of refractive optical components in the form of condensing lenses 22a, 22b, 22c and 22d, which are respectively associated with the reflectors 20a–20d. The condensing lenses 22 may be formed from glass, acrylic or any other suitable transparent material and may comprise gradient index lenses, light pipes or other suitable optical focusing elements.

Referring to FIG. 4, a simplified cross-section of a portion of the light engine 10 is illustrated that shows the arrangement of the light source 18, condensing lens 22b and reflector portion 20b. It will be appreciated, however, that the construction of each of the reflectors 20a, 20c and 20d, as well as their respective condensing lenses 22a, 22c and 22d, are identical to that shown in FIG. 2, and therefore the details of construction provided in connection with the structure shown in FIG. 4 will be understood to apply also to the reflectors 20a, 20c and 20d and condensing lenses 22a, 22c and 22d shown in FIG. 3.

The reflector portion 20b preferably includes a reflective surface 24 for maximizing the amount of light that is reflected from the reflector 20b. The condenser lens 22b is arranged forwardly in the direction of light propagation of the light source 18 in such a manner that a shadow zone 26 is created. Importantly, the shadow zone 26 is formed such that it extends to an outer most edge 28 of the reflector 20b. The light source 18 is disposed at a focus 30 of the reflector 20b. The reflector 20b serves to reflect the accurate, "high angle" light rays 32 emanating from the light source 18. The condensing lens 22b, however, operates to focus a forwardly projected portion of the light rays 36 onto the target plane 34. It will be noted that light rays 32 and 36 substantially overlap one another when they reach the target plane 34. In practice, the target plane 34 may be any form of optical coupling element which can be used to direct the optical energy received onto a face of a light transmitting element such as an optical fiber or optical fiber bundle. Since no optical energy is reflected rearwardly (i.e., to the left) in the drawing of FIG. 4, the resulting spot size of the beam produced at the target plane 34 is significantly reduced over that which would be produced at the target plane 34 if rearwardly projecting light rays from the light source 18 were to be reflected towards the target plane 34.

Figure 5:
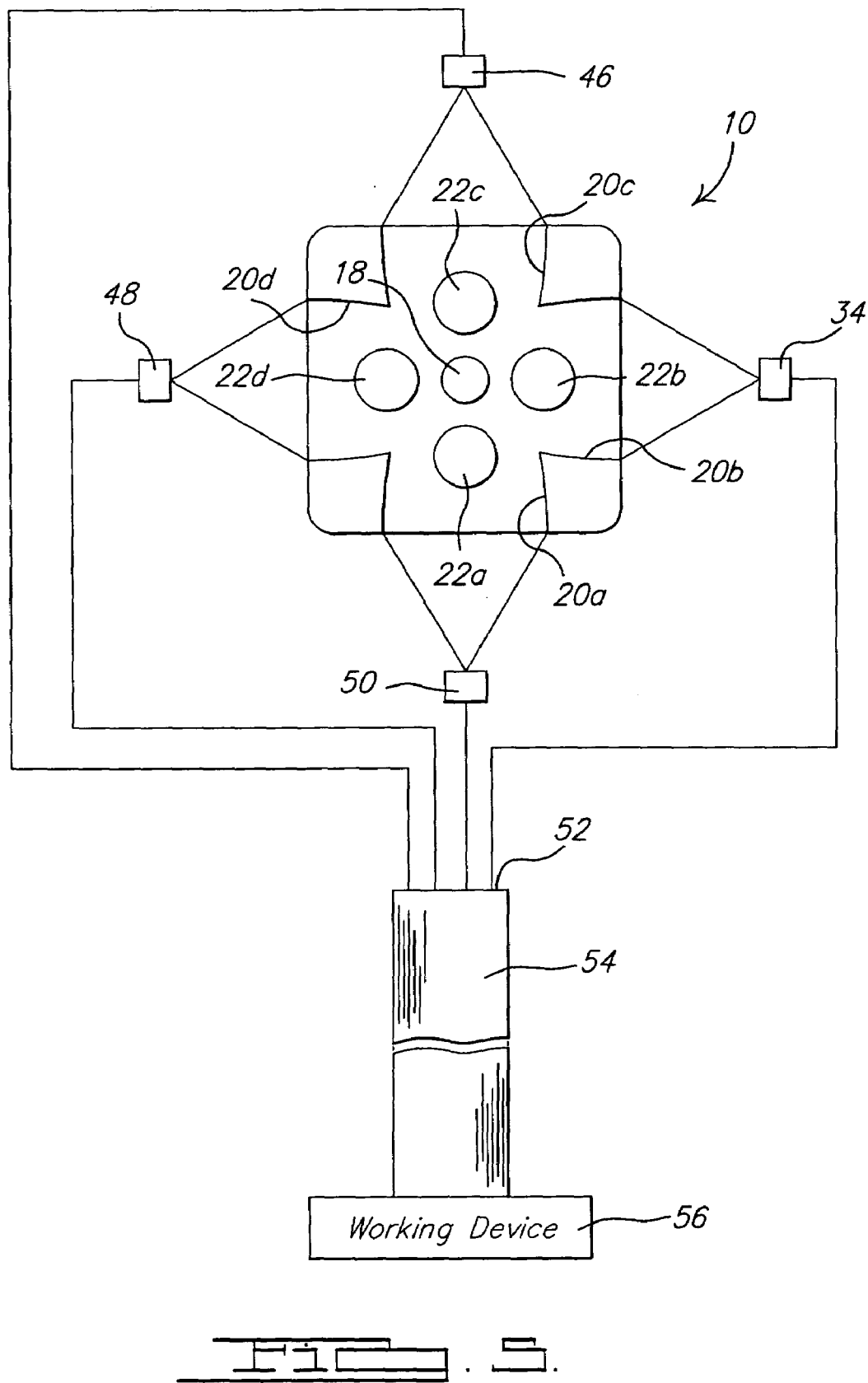
FIG. 5 is a plan view of the 4 port light engine feeding optical signals into an optical fiber element, which in turn feeds a working device.

FIG. 5 illustrates the light engine 10 from a plan view. Reflected light beams 38, 40, 42 and 44 are received by target planes 34, 46, 48 and 50, respectively, and the beams are routed to a face 52 of an optical fiber bundle 54. The optical fiber bundle 54 then transmits the optical energy to a working device 56. By assembling four ellipsoidal reflectors 20a–20d at 90 degree angles from each other, and all with a common focus at the light source 18 center, only the high angle, accurate light rays are received by the reflectors 20a–20d and are reflected toward their respective target planes 34, 46, 48 and 50. This feature, taken in connection with the use of the four condensing lenses 22a–22d, produces a significant reduction in the spot size of each of the light beams directed at each of the target planes 34, 46, 48 and 50. When compared to a conventional Siamese "dual-ellipsoidal" light engine, as shown in FIG. 6, the light engine 10 of the present invention provides a calculated equivalent spot size reduction of five times that of the beam spot produced by the Siamese, dual-ellipsoidal light engine, as well as an average lumens per fiber increase of 21 times over the Siamese, dual-ellipsoidal light engine. In FIG. 6, the illuminated zone at each side of the light engine expands a distance of approximately 4.222 inches (107.23 millimeters). For the two port configuration shown in FIG. 6, the charts of FIGS. 7 and 8 illustrate the increase in the power transmitted to a given diameter fiber bundle, as well as the reduction in spot size of the beam produced by the light engine 10 of the present invention.

The light engine 10 of the present invention thus provides a means to significantly increase the optical energy transmitted to a face of an optical fiber bundle, or any other form of optical transmitting component, while concurrently reducing the spot sizes of the light beams produced by the light engine 10. The light engine 10 thus more efficiently transmits optical energy from a light source into an optical fiber bundle or other optical component for even more effective use in applications where optical fibers, light guides or other optical components are used to transmit light to a working device or element located remotely from the light engine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A light engine for generating a high intensity, narrowly focused optical output signal, the light engine comprising:
    a light source for generating an optical input signal;
    a refractive optical focusing element disposed so as to receive a first portion of said optical input signal and to focus said first portion into a first output signal component that is directed at a target;
    a reflector forming a housing to house said refractive optical focusing element, and arranged adjacent said light source to reflect a second portion said optical input signal that does not illuminate said optical focusing element towards said target, said second portion forming a second output signal component;
    wherein said reflector houses said light source, and includes a plurality of four of ellipsoidal reflectors formed in said housing and arranged at 90° angles to one another; and
    wherein said refractive optical focusing element and said reflector cooperatively operate to focus said first and second output signal components to an approximately common spot size, such that said first and second output signal components substantially overlap one another at a desired target plane to form a unified, focused optical output signal focused on said target.

2. The light engine of claim 1, wherein said optical focusing element is disposed in relation to said reflector such that said first portion of said optical input signal represents that portion of said optical input signal that would not illuminate said reflectors.

3. The light engine of claim 1, wherein said refractive optical focusing element comprises a condenser lens.

4. The light engine of claim 1, wherein said refractive optical focusing element comprises a light pipe.

5. A light engine for forming a plurality of distinct, high intensity and narrowly focused optical output signals, the light engine comprising:
    a housing having a hollowed out center portion and a plurality of reflectors forming apertures in said housing;
    a light source disposed within said hollowed out center portion for generating an optical input signal;
    refractive optical focusing elements disposed in each said aperture so as to be housed within a respective one of said apertures, and so as to receive a first portion of said optical input signal and to focus said first portion through an associated one of said apertures such that a plurality of first output signal components are generated that are directed at a target;
    said reflectors arranged adjacent said light source and each being associated with a given one of said refractive focusing elements to form a plurality of pairs of focusing subassemblies;
    each said reflector operating to reflect second portions of said optical input signal that do not illuminate said optical focusing elements towards said target, said second portions forming second output signal components that are directed out from said apertures, and said refractive optical focusing elements receiving said first portions of said optical input signals directly from said light source without being reflected by said reflector; and
    wherein associated ones of said first and second output signal components are focused by each of said focusing subassemblies to substantially overlap one another at each one of a plurality of separate, spaced apart, targets to produce a plurality of focused optical beams.

6. The light engine of claim 5, wherein said first and second output signal components each have a substantially identical spot size.

7. The light engine of claim 5, wherein each said reflector comprises a frustoconical ellipsoidal reflector.

8. The light engine of claim 5, wherein each said optical focusing element comprises a condenser lens.

9. The light engine of claim 5, wherein each said optical focusing element comprises a light pipe.

10. The light engine of claim 5, wherein said reflectors are arranged at 90° angles relative to one another.

11. The light engine of claim 5, wherein said housing comprises four said reflectors.

12. The light engine of claim 11, wherein adjacent ones of said reflectors are arranged at 90° angles relative to one another.

13. A method for focusing light from a light engine onto a plurality of targets, comprising:
    using a plurality of refractive optical focusing elements to receive a first portion of an optical signal directly from a light engine and to focus a plurality of first output signals each to a desired spot size onto said targets; and
    using a plurality of reflectors to receive a second portion of said optical signal from said light source to focus a plurality of second output signals onto said targets, and further such that each said second output signal has a spot size at least substantially identical to a spot size of each said first output signal, and such that said first output signals and said second output signals overlap one another to form a plurality of distinct, focused optical beams that each impinge a respective one of said targets.

14. The method of claim 13, wherein using reflectors comprises using a plurality of ellipsoidal reflector elements arranged at 90° angles to one another that form an ellipsoidal reflector assembly.

15. The method of claim 13, wherein using refractive optical focusing elements comprises using condenser lenses.

16. The method of claim 13, wherein using refractive optical focusing elements comprises using a plurality of light pipes.

17. A light focusing system for simultaneously generating a plurality of focused optical beam from a single light source, wherein said light source generates an optical input signal, said system comprising:
    a housing;
    a plurality of refractive optical focusing elements disposed within said housing so as to each receive a first portion of said optical input signal and to focus each said first portion into an associated first output signal component that is directed at an associated one of a plurality of spaced apart targets;
    wherein said refractive optical focusing elements are arranged at 90° angles relative to one another;
    a plurality of ellipsoidal reflectors arranged at 90° angles within said housing, relative to one another, and adjacent said light source, to reflect second portions of said optical input signal that do not illuminate said refractive optical focusing elements towards respective ones of said targets, said second portions forming second output signal components;
    wherein cooperative pairs of said refractive focusing elements and said ellipsoidal reflectors each focus respective ones of said first and second output signal components to cooperatively produce light beams having substantially similar spot sizes which overlap one another to form a single, focused light beam at each one of said targets; and
    said refractive optical focusing elements each receiving said first portions directly from said light source without being reflected by said reflectors.

* * * * *